United States Patent
Rohatgi

(10) Patent No.: US 10,161,026 B1
(45) Date of Patent: Dec. 25, 2018

(54) SELF HEALING LEAD, TIN, AND THEIR ALLOYS, AND SOLDERS, INCORPORATING SHAPE MEMORY ALLOYS, REACTIVE PARTICLES AND HOLLOW VASCULAR NETWORKS

(71) Applicant: Pradeep Kumar Rohatgi, Milwuakee, WI (US)

(72) Inventor: Pradeep Kumar Rohatgi, Milwuakee, WI (US)

( * ) Notice: Subject to any disclaimer, the term of this patent is extended or adjusted under 35 U.S.C. 154(b) by 244 days.

(21) Appl. No.: 15/216,361

(22) Filed: Jul. 21, 2016

Related U.S. Application Data

(63) Continuation of application No. 13/928,486, filed on Jun. 27, 2013, now Pat. No. 9,435,014.

(51) Int. Cl.
*C22C 11/00* (2006.01)
*C22C 13/00* (2006.01)
(Continued)

(52) U.S. Cl.
CPC .............. *C22F 1/006* (2013.01); *B22D 19/02* (2013.01); *B22D 21/007* (2013.01);
(Continued)

(58) Field of Classification Search
None
See application file for complete search history.

(56) References Cited

U.S. PATENT DOCUMENTS

| 5,217,382 A * | 6/1993 | Sparks | H01R 13/187 439/161 |
| 8,518,531 B2 * | 8/2013 | Rohatgi | B22D 19/14 428/320.2 |

(Continued)

FOREIGN PATENT DOCUMENTS

JP   2007326124 A  * 12/2007

OTHER PUBLICATIONS

Manuel, M.V. et al., "Biomimetic Self-Healing Metals", Proceedings of the First International Conference on Self-Healing Materials, Apr. 2007, Noordwijk aan Zee, Netherlands, 8 pp.*
(Continued)

*Primary Examiner* — George Wyszomierski

(57) ABSTRACT

The invention discloses the internal structures and processes to synthesize the structure of self-healing materials, especially metallic materials, metal matrix micro and nanocomposites. Self-healing is imparted by incorporation of macro, micro or nanosize hollow reinforcements including nanotubes, filled with low melting healing material or incorporation of healing material in pockets within the metallic matrix; the healing material melts and fills the crack. In another concept, macro, micro and nanosize solid reinforcements including ceramic and metallic particles, and shape memory alloys are incorporated into alloy matrices, specially nanostructured alloy matrices, to impart self healing by applying compressive stresses on the crack or diffusing material into voids to fill them. The processes to synthesize these self-healing and nanocomposite structures, including pressure or pressureless infiltration, stir mixing and squeeze casting in addition to solid and vapour phase consolidation processes are part of this invention.

9 Claims, 5 Drawing Sheets

(51) Int. Cl.
  *C22C 47/08* (2006.01)
  *C22F 1/00* (2006.01)
  *B23K 35/28* (2006.01)
  *B23K 35/26* (2006.01)
  *B23K 35/36* (2006.01)
  *B22D 19/02* (2006.01)
  *B22D 21/00* (2006.01)

(52) U.S. Cl.
  CPC .......... *B23K 35/262* (2013.01); *B23K 35/286* (2013.01); *B23K 35/3601* (2013.01); *C22C 11/00* (2013.01); *C22C 13/00* (2013.01); *C22C 47/08* (2013.01)

(56) References Cited

U.S. PATENT DOCUMENTS

| | | | | |
|---|---|---|---|---|
| 9,435,014 | B2* | 9/2016 | Rohatgi | B22D 19/14 |
| 2004/0202888 | A1* | 10/2004 | Cheng | C23C 26/00 |
| | | | | 428/651 |
| 2005/0158573 | A1* | 7/2005 | Elzey | C22F 1/006 |
| | | | | 428/593 |
| 2005/0284512 | A1* | 12/2005 | Heremans | H01L 35/16 |
| | | | | 136/236.1 |
| 2011/0003159 | A1* | 1/2011 | Mather | B32B 7/02 |
| | | | | 428/425.6 |
| 2017/0121800 | A1* | 5/2017 | Manuel | C22F 1/006 |

OTHER PUBLICATIONS

Translation of JP 2007-326124 (published Dec. 20, 2007) from J-Plat Pat.*

* cited by examiner

SELF HEALING LEAD, TIN, AND THEIR ALLOYS, AND SOLDERS, INCORPORATING SHAPE MEMORY ALLOYS, REACTIVE PARTICLES AND HOLLOW VASCULAR NETWORKS

FIELD OF INVENTION

This invention relates to internal structures and processing which result in self healing characteristics in metallic alloys, including structural alloys and solders.

BACKGROUND OF THE INVENTION

This patent disclosure covers the internal structures and processing of self-healing materials, including metal matrix composites, which exhibit self-healing behavior. The most popular types of self-healing materials are those that are designed to mimic human skin and bones, which can heal itself as needed. When these "self-healing" materials are cracked or damaged, a healing agent can be triggered to flow into the damaged area to "heal" the damage, much like a cut in human skin triggers blood flow to promote healing. Another concept in self-healing is where the cracks in materials are subjected to compressive stresses to close them or to have material diffuse into the cracks or voids to close them. As engineering systems are becoming more sophisticated they need to take on more of the characteristics of biological systems. There is an obvious potential benefit in copying biological reliability strategies in materials manufactured and used in industry. While the basic concepts of this invention are demonstrated mainly by metallic materials, they are applicable to all type of materials, including polymers, ceramics and cementitions materials.

The composite disclosed in this work consists of an alloy matrix with hollow macro, micro and nanotubes or balloons or fibers as reinforcements, which encapsulate a lower melting point alloy (the healing agent). In this invention, the self-healing concept will be deemed successful as a result of the flow of the "healing agent" into the crack, which will lead to the recovery of a percentage of the original mechanical properties in metallic matrices. Another type of self-healing material described in this work is where the cracks are subjected to compressive stresses due to phase transformations, including those in nano structure of matrix materials and reinforcements which may be nanosize themselves.

One of the concepts of self-healing involves the flow of the healing agent into the crack, which will then be sealed through solidification of the healing agent with or without reactions with alloy matrices. The matrix will then have recovered a percentage of its original uncracked mechanical properties. The liquidus temperature of the low melting material which heals the cracks is defined as the healing temperature. When the alloy reaches the healing temperature it will be completely molten, and due to the internally or externally generated pressure or capillary pressure and surface tension, it will flow out of the ceramic tube and into the crack. When the temperature decreases or a reaction occurs with the matrix, the alloy will be solidified and will seal the crack.

The composite disclosed in this invention also includes self healing metal matrices including nanostructured matrix materials in which ultra fine or nanosize reinforcements of shape memory alloys or other reinforcements which can help compressively shut or help heal cracks, or seal a void by enhancing diffusion, are incorporated to impart self-healing characteristics.

SUMMARY OF INVENTION

This invention involves conception of structures at macro, micro and nanoscale in materials, specially metallic materials that lead to self healing behavior, and conception of processes to synthesize these structures using processes including solidification, solid state and vapour phase processes. The significant approaches of this invention are listed below.

(i) In the first approach, hollow reinforcements such as hollow fibers or microballoons containing low melting point alloy in their cavities are incorporated into the material matrix. When a crack develops such hollow reinforcements fracture in front of a crack upon heating or application of external fields release a low melting fluid/alloy in liquid form which flows into the crack, and solidifies with or without reaction with the matrix or ambient atmosphere to seal it, providing healing. The hollow fibers or micro balloons can be macro, micro and nanometers in size. A dissolution or peritectic type reaction or cooling could lead to solidification of the healing liquid. The flow of healing liquid into the crack can be promoted by capillary, surface tension, thermal expansion generated pressure on external fields including local heating and electromagnetic energy.

(ii) In the second approach, hollow spaces comprising a "vascular network" are incorporated into the metal matrix and functions similar to the above mentioned hollow reinforcements.

(iii) The third approach involves the incorporation of hollow carbon nanotubes in the matrix of aluminum wherein the internal cavities of carbon nanotubes will be filled with a suitable low melting alloy and then incorporated into the matrix of aluminum alloys to form the nanocomposite. The cracks will break the nanotubes, and at suitable temperatures will release the healing agent into cracks in the form of liquid: upon solidification of the liquid in the crack, with or without reaction with the matrix or ambient atmosphere, the crack will be sealed. It will be desirable to have reaction products which occupy higher volume to help seal the crack.

(iv) In the fourth approach, the low melting alloy that does the healing can be present in the alloy matrix in the form of pockets without a container. Upon heating the pockets melt and expand and fill the crack and seal the crack upon solidification leading to self-healing. The low melting alloy of pockets can be a eutectic or peritectic pocket formed upon solidification, the pockets can melt at a much lower temperature than the matrix.

(v) The fifth approach includes the incorporation of suitable solid reinforcements including macro, micro and nano size particles, including shape memory alloys, in suitable forms in a selected distribution in a matrix metal. The shape memory alloys due to change in shape as a result of phase transformation compress the metal matrix and "shut" the crack thereby healing it. The presence of suitable macro, micro, and nanosize reinforcements including alumina, especially in a nanostructured matrix material can also help self heal a material, due to large interfacial area and enhanced diffusion of material into voids or cracks.

(vi) The sixth approach involves incorporation of micro and nanosize reinforcements in matrices to impart self healing by closing of voids due to enhanced diffusion.

BRIEF DESCRIPTION OF THE DRAWINGS

The following is a more detailed description of some embodiments of the invention, by way of example, reference being made to the accompanying drawings in which:

In FIG. 1-A-I the typical geometry for the matrix/reinforcement combination is shown. In FIG I-A-II the rupture of the hollow reinforcement walls is shown. In FIG. 1-A-III the exudation of a low melting point lubricant into a crack after the metal matrix is heated and then solidifies resulting in healing of the crack is described. FIG 1-B shows the exudation of a low melting point lubricant onto a tribosurface when normal lubrication fails, thus healing the tribological failure.

FIG. 6 shows examples of self-healing.

FIG. 7 shows the self-healing of solder.

DETAILED DESCRIPTION OF THE INVENTION

This invention consists of the conceptualizing of internal structures and processes to synthesize self-healing materials, especially metals and metal matrix composites, including nanostructured materials.

1. Concept of Self-Healing in Metallic Systems

Figure 1:
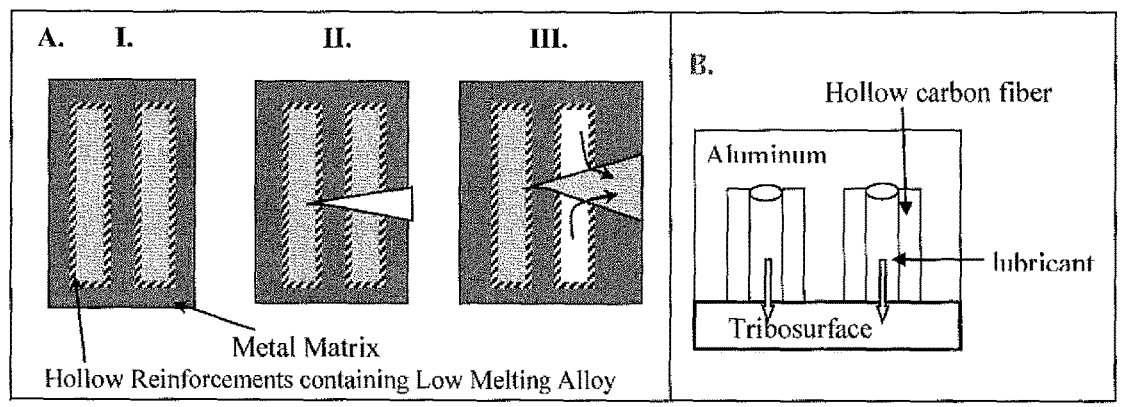
FIG. 1 is a schematic drawing of a metal matrix that includes hollow reinforcements containing a low melting point alloy in their cavities.

FIG. 1A demonstrates the concept, which will be used to exhibit self-healing in solders and structural aluminum alloys by incorporating hollow fibrous reinforcements containing very low melting point alloys in their internal cavities. When a crack in the matrix approaches such reinforcement, it will under certain conditions fracture the hollow reinforcements, exposing the low melting point healing alloy. When the composite is heated above the melting point of the healing alloy, the alloy will flow out of the hollow reinforcement into the advancing crack and will solidify by cooling the component to below the melting point of the healing alloy to normal lower operating temperatures, or through reactions with the matrix including dissolution and peritectic reactions. The wetting, capillarity, and viscosity will need to be tailored for the liquid to flow into cracks or onto tribological surfaces. The use of micro and nanosize hollow reinforcements will enable self-healing of cracks at different length scales. The concept of flow of lubricant from hollow reinforcements onto a tribological surface to provide self-healing against a failure of lubricant on a tribological surface is shown in FIG. 1B and described in more detail later.

2. Specific Metallic Systems Used to Demonstrate the Self-Healing Phenomenon

Table 1 lists two examples of metallic alloys that would benefit from self-healing. Solder alloys used in electronic packaging and structural aluminum alloys used in transportation could both benefit from self-healing characteristics using hollow carbon fibers or nanotubes filled with low melting alloys.

TABLE 1

Self-Healing Solders using Hollow Carbon Fibers and CNT filled with Low Melting Alloys.

| Matrix | Reinforcements | Multifunctionality |
|---|---|---|
| Lead Free Solder Alloy 95.5% Sn, 3.8% Ag, 0.7% Cu | Hollow Carbon Fibers containing low melting alloy and nanotubes internal cavities | Self Healing behavior due to exudation of low melting liquid |
| Aluminium Alloy | Hollow Carbonfibers or Carbon Nanotubes containing low melting alloys in internal cavity | Self Healing behavior due to exudation of liquid out of nanotubes onto a tribological surface or into an advancing structural crack |

Active and Self-Healing Nano-Particle Reinforced Solder Matrix Nanocomposites for Microelectronic Packaging.

There is need to develop novel solder microstructures that can substantially enhance the reliability of the package. There have been recent attempts in developing solders reinforced with micron-scale NiTi shape-memory alloy particles, which lead to improvements in joint-life. As solder joints shrink progressively and the maximum chip operating temperature increases with advancing semiconductor technology, the joints will be subjected to increasingly aggressive thermomechanical conditions, greater imposed shear strains and temperatures. To counteract this, a finer, more even dispersion of NiTi particles would be required. Furthermore, since the scale of the joints is already approaching 40-50 µm and will decrease to ~10-20 µm in the near future, the reinforcement scale would have to be in the nanometer regime. By enabling a more even distribution of reinforcements throughout the solder for a given volume fraction, nanoscale NiTi particles are expected to decrease the tendency to local damage in the solder, but also by more effectively reducing internal strain localizations as compared with micro-scale particles. This invention includes incorporation of ultra fine and nanosize particles including those of shape memory alloys in solder matrix alloys to impart self-healing behavior.

Self Healing Solders Using CNT Filled with Low Melting Alloys as Reinforcements.

There is also a need to develop self-healing solders that can retain at least partial electrical and mechanical connection even after a crack has propagated through the joint. Nanoscale reinforcement of solders with carbon nanotubes filled with a low melting point solder (such as In-48Sn, m.p.=117° C., or In-33.7Bi, m.p.=72.4° C.) provides a promising avenue to achieve this end. As cracks propagate through a solder joint, the low melting point liquid filler can exude from the nanotube reinforcements, thus (a) bridging and healing a developing crack, and (b) providing an electrically conductive path across the crack to enable partial electrical interconnection even following a partial failure of the joint. Together, these two mechanisms can lead to solder joints with substantially longer useful life than conventional solders since they will repair cracks on nanoscales. In particular, the useful electrical life is likely to be substantially enhanced, since even small amounts of exudant to maintain electrical contact across the crack faces. In view of this, reinforcement of solder alloys with carbon nanotubes filled with low melting alloys will lead to self-healing behavior. No such work has been reported in metal matrices, especially using filled carbon nanotubes. In recent years there has been considerable activity in filling nanotubes with a variety of fluids and solids including low melting metals. When a crack in the matrix approaches such reinforcement in a suitably designed composite, it will release the low melting point healing material including alloys. When the composite is heated above the melting point of the healing alloy, the alloy will flow out of the hollow reinforcement into the advancing crack and will solidify by cooling the component to below the melting point of the healing material to normal lower operating temperatures or through reactions with the matrix or ambient atmosphere including dissolution and peritectic reactions. The wetting, pressures, external fields, capillarity, and viscosity will be tailored for the liquid to flow into cracks or onto tribological surfaces. The use of nanosize hollow reinforcements will enable self-healing of cracks at different length scales, specifically when they are nanoscale when the cracks first initiate. If they are self-healed at this length scale using the liquid inside one of the carbon nanotubes, they will not grow in size to lead to catastrophic failure.

Nanosize Particles of Shape Memory Alloys Incorporated in Aluminum Alloys.

This patent discloses obtaining larger improvements in properties of aluminum alloys by dispersing nanosize particles, including those of shape memory alloys in their matrix. Solidification processing is envisaged as one of the preferred routes to synthesize Al-Nanosize SMA Nanocomposites. In this invention, however other processes including solid or vapor phase processes to synthesize self-healing alloys are also part of this invention.

Self-Healing Composites Against Tribological Failures

Ground, air and sea based equipments often need replacement due to failure of tribological components. Some examples include seizure of truck and tank engines and helicopter engines due to drainage of lubricating oil. In other instances, failure of lubricant pump or contamination with dust can also lead to unexpected rise in temperature of tribological components like bearings, pistons, liners, and sleeves, leading to component failure.

The proposed invention leads to development of smart self-healing composites for tribological applications which will release lubricant when the temperature rises above critical levels above which failure can result (FIG. 1b). The lubricant will be in the form of organic materials and low melting materials, including metals, which will be stored in the hollow spaces of hollow fibers, including carbon fibers embedded in metallic matrices to provide structural function. Carbon fiber reinforced metal matrix composites are known to provide lighter weight components. During service, if the temperature rises above a critical value, the lubricant will be heated and it will melt, expand and exude out of the hollow spaces within the fibers to the tribosurfaces to provide lubrication. The latent heat of melting and flow of lubricant will also cool the tribosurface; the reduced friction due to exuded lubricant will eventually reduce the heat generated at the tribosurface. The overall component will be multifunctional in that it will bear structural load, provide tribological load transfer, and will be smart and self healing against tribological failure. These types of smart self-healing tribological components can delay the failure of the components due to unexpected rise of temperature or lubricant failure. A helicopter may get enough extra time to safely land, or a tank or truck may get enough time to come to a safe territory before total failure.

Figure 2:
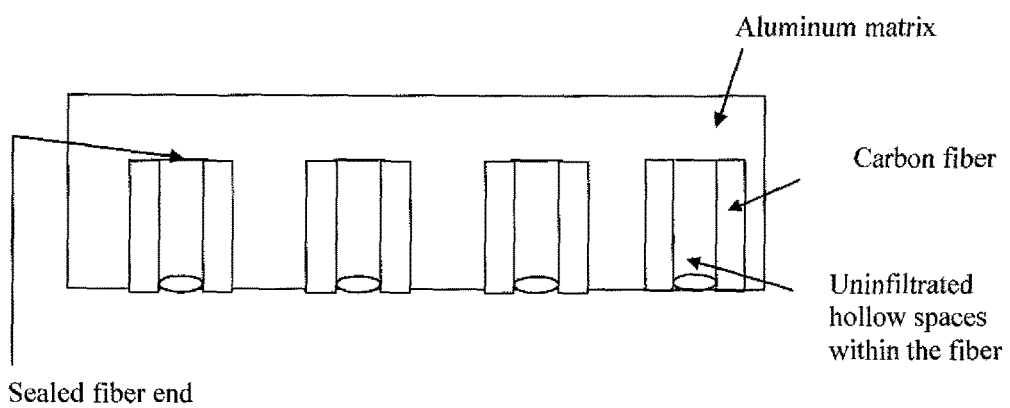
FIG. 2 is a schematic drawing showing how solidified aluminum seals one end of carbon fibers and infiltrates interfiber spaces, but does not infiltrate the hollow spaces inside the fibers. The mechanism for self-healing described in this drawing will require tailoring of the pressure infiltration parameters.

While the invention is targeted to provide smart self healing characteristics against tribological temperature rise, it can also be extended to self healing against cracks in structural application. The invention can be summarized as follows:

(1) The invention is to infiltrate hollow fibers with aluminum melts to make composites shown in FIG. 2. Hollow fibers will be incorporated in the matrix of aluminum alloys using pressure infiltration of the interfiber spaces by molten aluminum alloys.

(2) Envisages infiltration of the hollow spaces within fibers, with liquid lubricants. The organic or metallic lubricants will be brought to liquid state by heating, and then infiltrated into the hollow spaces within the fibers. The liquid will then solidify upon cooling. During tribological failure the temperature will rise and the lubricant will again melt and come to the tribosurface.

(3) Tribology tests will demonstrate the superiority of smart self healing tribological capabilities of composites envisaged in the invention. The activation of the self healing character will occur the temperature rises as a result of tribological failure.

(4) The hollow fibers can be macro, micro and nanometers in size.

Examples of Materials Envisaged to be Used in Self-Healing Tribological Composites.

Table 2 lists the materials which can be utilized as an example for synthesizing self healing aluminum-hollow fiber composites. Hollow carbon fibers will be embedded in aluminum alloys. Low melting alloys, including tin, or organic esters can be utilized as lubricants to fill hollow fibers. As shown in Table 2, the difference in thermal properties and mechanical properties of the alloys and lubricants will facilitate the lubricants in hollow fibers to melt and exude to the tribosurface in response to external conditions. During sliding, heat generated causes expansion of aluminum, hollow carbon fiber, and lubricants filled in hollow fibers. The higher thermal expansion of lubricants will facilitate exudation of lubricants to the tribosurface.

TABLE 2

Various properties of aluminum alloy and tin alloys, organic ester, and carbon fiber.

|  | Al alloy | Sn alloy | Organic ester | Carbon fiber |
|---|---|---|---|---|
| Thermal conductivity, W/mK | 216 | 0.6 |  | 520 |
| Thermal expansion, $10^{-6}$/C. | 17 | 21 | 1200 | −1.6 |
| Heat capacity, J/kg · K | 890 | 230 |  | 709 |
| Density, g/cm$^3$ | 2.7 | 7.2 | ~1.1 | 2.15 |
| Young's modulus, GPa | 71 |  |  | 725 |
| Tensile strength, GPa |  | 0.6 |  | 2.2 |

Self-Healing Composites Against Lubrication Failures.

Hollow fibers including graphite fibers (FIG. 2) will be embedded in matrix of different materials, including aluminum matrix alloy (as shown in FIG. 2) using the pressure infiltration and squeeze infiltration processes. The infiltration process will be tailored to initially infiltrate molten materials, including aluminum only in the interfiber spaces, but not in the hollow spaces within the fibers. The next step will be to infiltrate the hollow spaces within the fibers by (a) organic liquids, including organic ester which has good wetting characteristics, or (b) low melting molten metals, including tin alloy and Babbitt alloy, using vacuum assisted pressure infiltration (FIG. 2). Low melting alloys including lead, tin, and their alloys have been used as lubricants. The infiltration process, which was developed to infiltrate carbon fibers will be modified to infiltrate the fibers as shown in FIGS. 2 & 3.

Figure 3:
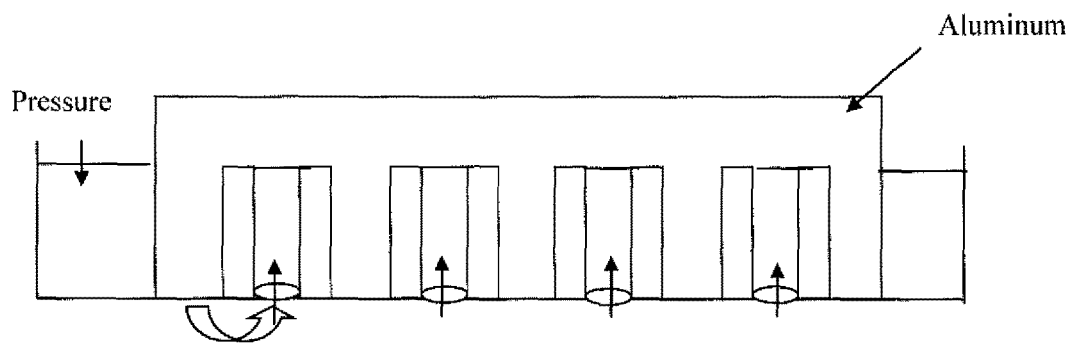
FIG. 3 is a schematic drawing showing how the liquid lubricants infiltrate into the hollow fibers under high pressure. The liquid lubricant could be an organic compound or a low melting point alloy melt. A wettable inside surface with low surface tension will facilitate capillary infiltration of the hollow spaces within the fibers.

In the stage shown in FIG. 3, the infiltration of liquid lubricants into the fibers will depend on the size of hollow spaces in the fiber and the surface tension between the fibers and liquid lubricants. In an earlier work, it has been possible to infiltrate hollow spaces within carbon nanotubes with metals like silver. The surface tension between carbon fiber and organic lubricants is not likely to be as high as between carbon fiber and metallic melts, which may facilitate infiltration by organic liquids; alloys will be used as lubricants mainly for high temperature systems where organic liquids will not function, or they cannot be retained in capillaries within the fibers. The modified infiltration technique will be used for infiltration of hollow spaces within the fibers with liquid lubricants, including molten alloys.

Figure 4:
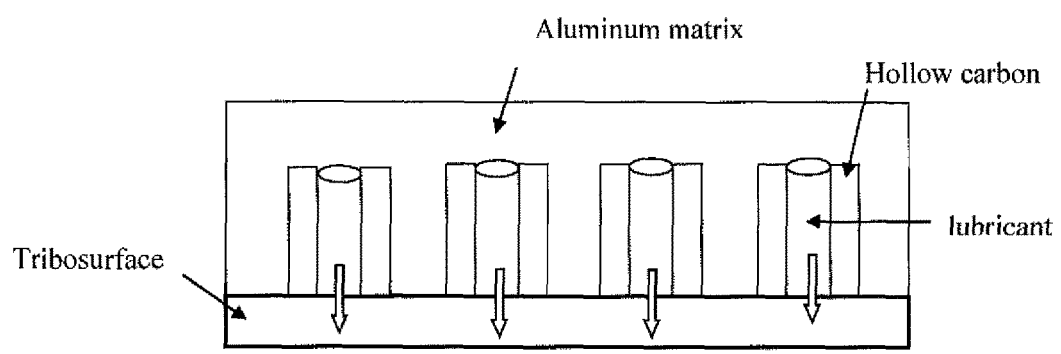
FIG. 4 is a schematic representation showing liquid lubricants exuding out of carbon fibers when the temperature of the tribosurfaces increases due to failure of an external lubricant or because of other instabilities. The temperature causes the lubricant to melt. The resulting volume expansion and further expansion with temperature causes the lubricant to reach the tribosurfaces thus providing lubrication and cooling. In the case of metals the latent heat property will also absorb some frictional heat.

The organic lubricants or low melting point alloys (which serve as lubricants after they melt) will exude out from within the fibers due to the temperature rise which will cause the lubricant to expand during melting, and further expand with superheated temperatures, and come to the tribosurfaces to provide lubrication and cool the tribosurfaces. In case of metallic lubricants, the latent heat of melting will also absorb significant frictional heat (FIG. 4). In view of this, aluminum reinforced with hollow carbon fibers filled with lubricants are expected to have better tribological properties under conditions where unexpected temperature rise occurs, as compared to solid carbon fiber reinforced composites.

Figure 5:
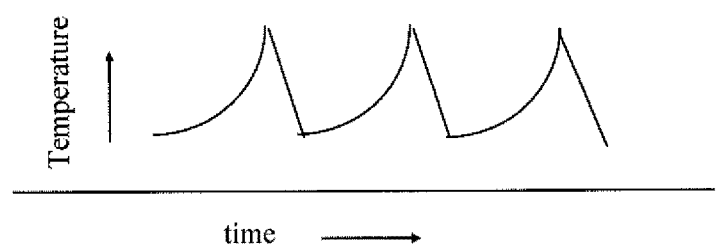
FIG. 5 is a graphical representation of the temperature at the tribological surface as a function of time. Temperature variations are the result of self-healing activation leading to the exudation of a lubricant.

The schematic representation of the variation in temperature occurring at the tribosurface due to periodic activation of self healing process is shown in FIG. 5. As shown in FIG. 5, the temperature at the tribosurface rises due to heat generated at the tribosurface and decreases with time after exudation of lubricants from hollow fibers, and after a while temperature increases again. The amount of liquid lubricant coming out of the fibers will also depend on the temperature at the tribosurfaces and the subsurface region; an increase in temperature at the tribosurface can also decrease the surface tension between the fibers and liquid lubricant in certain systems, which can facilitate flow of more liquid lubricant to the tribosurface at higher tribosurface temperatures.

Theoretical aspects of pressure infiltration, considered by Washburn and Youngs, are based on Darcy's law which gives the infiltration length h at a given time t as a function of the pressure drop $\Delta P$ (which can be taken as $P-P_0$):

$$h^2 = \frac{2kt}{\mu(1-V_p)}\Delta P$$

where k is the intrinsic permeability of the packed reinforcement; $\mu$ is the viscosity of the melt; $V_p$ is the volume fraction of reinforcement. From the above equation, the threshold pressure $P_0$ is expressed as $$P_0 = 6\lambda\gamma\cos\theta\frac{V_p}{(1-V_p)D}$$

where $\theta$ is the contact angle; $\gamma$ is the liquid-vapor surface tension; $\lambda$ is a geometrical factor; D is fiber diameter. Applied pressure required for infiltrating hollow spaces between the fibers will be estimated using the models developed by the above researchers. However, applied pressure for infiltration of molten melts into hollow fibers will be predicted by modifying the models by incorporating the effect of fiber temperature which is lower than that of infiltrating liquids. Wherever necessary the inner surfaces of hollow fibers will be suitably pretreated or coated to facilitate infiltration. Likewise selected surface tension reducing agents will be added to lubricants before they will be infiltrated into the hollow spaces within the fibers.

In this invention envisages optimization of volumetric expansion accompanied with melting, thermal expansion, viscosity, surface tension, reactivity, spreadability, lubricity, and thermal stability of lubricant for exudation of lubricant. The data will also be utilized to estimate the rate of exudation of lubricants out of carbon fibers on to the mating surface during sliding wear of composites.

The data on mechanical properties will be measured both before and after the activation of self healing since exudation of lubricant is likely to change the mechanical properties. The mechanical properties will determine the kind of loads under which these types of tribological components can be used.

Nanotubes filled with low melting alloys incorporated in the Matrix of Aluminum Alloys: Self healing Aluminum-CNT nanocomposites for tribological Applications For self-healing behavior of aluminum alloys in tribological applications, the arrays of nanotubes will selectively reinforce the matrix near the tribosurface. The hollow cavities of nanotubes will be filled (either before or after making the Al-CNT composite) with low melting point liquids including alloys, which in molten state can act as a lubricant. If, due to the failure of a conventional lubricant or a tribological instability, the temperature at the tribosurface rises above the melting point of low melting alloys in the internal cavities of the nanotubes, the alloy will melt and exude out onto the tribosurface, providing some lubrication. The exudation of the alloy will be possible due to the difference in coefficients of thermal expansions of the low melting alloy, CNT, the matrix, and the volumetric expansion of the alloy associated with melting.

These parameters will be optimized for different combinations to select the low melting alloy that will exude readily and provide lubrication as well. Availability of self-healing lubricants at nanoscale will be advantageous; the nanometric size of and nanometric spacing of filled nanotubes will be used in the invention.

Nanocomposites and Nanostructures Exhibiting Self-healing Behavior, and Methods of Their Production:

Metal matrix nanocomposites are emerging materials with great technological importance due to the unique properties they possess. For example, carbon nanotubes have been shown to exhibit ultrahigh strength and modulus, and also have anisotropic electrical conductivity. When included in a material matrix, these nanotubes could impart significant property improvements to the resulting nanocomposite. These materials derive their properties from dominant structural features below 100 nm in size. Due to their size, properties of nanomaterials are dominated by their surface characteristics. The opposite is the case for microscale reinforcements where the bulk properties of the particles dominate. Nano-phase reinforcements like CNTs and SiC have much higher strengths in comparison to similar micron scale reinforcements, and, in some cases, these nanoscale reinforcement additions lead to property changes in the metal. For instance, nano-scale reinforcements can result in nanosize grain formation in the matrix that also increase the strength of the MMNC through the Hall-Petch effect. The unique interfaces that are hypothesized to form between nanosized reinforcements and the matrix can lead to even greater improvements in the mechanical properties due to the strong interface bonding between the reinforcement phase and the matrix, and through secondary strengthening effects such as dislocation strengthening. Matrices that have been used in the past to synthesize dispersion strengthened metal matrix nanocomposites include but are not limited to Al, Mg, Cu, Fe, Ti, Ni, Sn, Pb among others and reinforcements have included $Al_2O_3$, SiC, Carbon, Carbon nanotubes, BN and others. Nanostructures have been produced by deformation processing, powder metallurgy, chemical vapor deposition and recently solidification processing.

It has been observed that nanosize particles coarsen and react at much lower temperatures than do microsize particles due to their large surface area. This leads to difficulties in their processing as nanosize particles will form agglomerates and or coarsen at relatively low temperatures and at a high rate.

Due to the difficulties in processing these materials, this invention describes both routes toward achieving self-healing in a nanocomposite and the processes to synthesize such self-healing materials, which are also part of the invention.

Concept 1: Nanoparticles Imbedded in a Metal Matrix to Influence Aging Heat Treatment.

Nanosize dispersions have long been utilized to achieve high strength in metal alloys through precipitation strengthening. In the case of Al—Cu alloys for example, a common heat treatment brings $Al_2Cu$ precipitates into solution, followed by quenching and aging the alloy to form nanosize $Al_2Cu$ precipitates. If the aluminum alloy is kept in an underaged condition, subsequent aging treatments can act to fill dislocation voids thus healing microdamage/defects in the alloy. In the case of a nanocomposite with nanoscale particle additives, this reaction can become much more rapid due to the increased dislocation density within the composite caused by thermal mismatch between the reinforcement and parent matrix, and improved aging characteristics of the alloy when it contains a dispersion of nanoparticles. These microstructures can be obtained by liquid metal dispersion techniques including stir mixing of nanoparticles in a liquid melt in presence of a wetting agent as described above. They also may be produced by pressureless infiltrating wetted compacts of ceramic nanoparticles dispersed in metallic powders. In the latter case, the nanostructure created will have both nanosize reinforcements and nanosize grains between individual nanoscale reinforcements.

Concept 2: Nanoscale Grains to Achieve Self-Healing Characteristics.

The grain size of a metal, ceramic or crystalline polymer may be tailored to achieve self-healing characteristics. In the case of microscale aluminum, mechanical working of the alloy increases the dislocation density and therefore increases the hardness of the alloy. By annealing the mechanically worked material, the hardness will decrease. In the case of aluminum with nanoscale grains, the dislocation density in the nanostructured material is so low as to be devoid of dislocations due to annihilation in the presence of a high percentage of high angle grain boundaries that act as dislocation sinks. Therefore, when this material is mechanically worked, microvoids or dislocations form which cause the material to become weaker. By annealing this same material, the strength can be recovered by the annihilation of dislocations at the grain boundaries. This material is thus a self-healing material due to this inherent behavior, and the same is likely to occur in the case of other monolithic metals, as well as in nanocomposites where nanosize particles pin grain boundaries to restrict their size to that of the nanoscale range.

Concept 3: Nanoscale Reactive Particles to Impart Self-Healing in Metals.

Nanosize additives may be incorporated in metal matrix nanocomposites by combinations of pressureless infiltration, dispersion and squeeze casting. Properly chosen, these additives could act as reactant particles which upon exposure to new metal surfaces (breakage of a barrier layer between the metal and the reinforcement) or through exposure to air could expand and seal cracks that neighbor the particles. One example could be the formation of $AlB_2$ and $Al_2O_3$ from Boron Oxide or B in an aluminum metal matrix. The $AlB_2$ phase, when in contact with air and at relatively low temperatures which can lead to the formation of either $B_2O_3$ or $Al_2O_3$. The accompanied expansion can be used to seal cracks near the surface containing reinforcement particles.

SPECIFIC EXAMPLES

Specific Example of Self-Healing Metals and Alloys Synthesized

Specific Example No 1

Figures 6A, 6B:
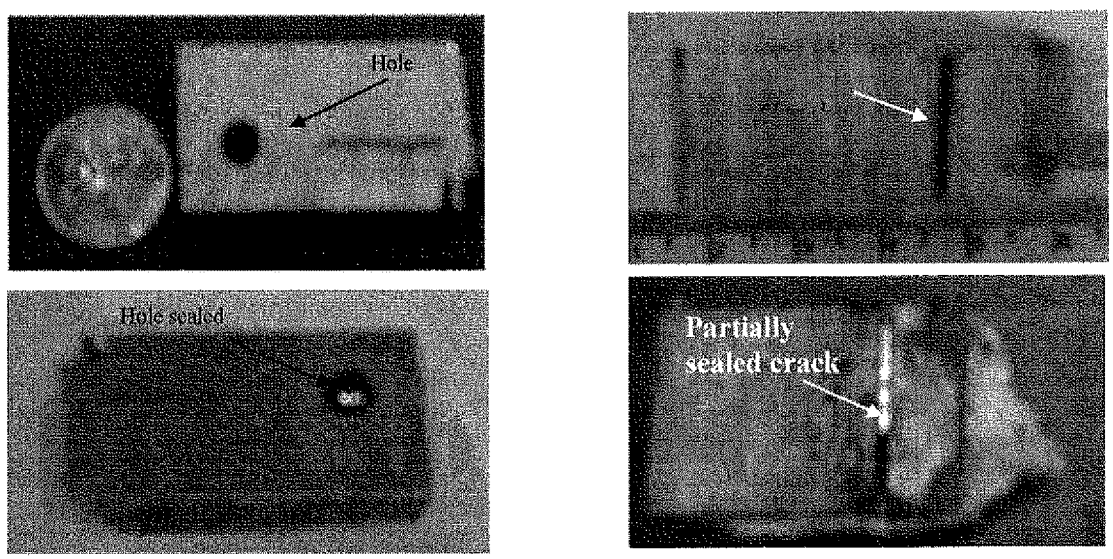
In FIG. 6a the photograph shows before (6a, i) and after healing (6a, ii) a cylindrical hole in the metal matrix.
In FIG. 6b the photograph shows the before (6b, i) and after healing (6b, ii) of a specimen containing a crack that is partially sealed with a low melting point alloy.

1. Aluminum Alloy Self-Healing Composite with Hole on the Surface Which was Self Healed The self-healing composite sample was made an aluminum alloy matrix with ceramic microtubes as reinforcements filled with low melting point alloy Sn60Pb40 as healing agent. The materials used to make the self healing composite were alumina tubes filled with solder alloy Sn60Pb40 and aluminum alloy 206 as a matrix. The dimensions of the tubes were: ID=2185 μm, OD=395 μm and length=75 mm. The spacing between the tubes, side to side, as seen from the front is 6 mm avg. and as seen from the side is 3 mm avg. A total of 7 tubes were placed in a wire mesh. Aluminum alloy 206 was cast with very low superheat (approx. 700° C.) in a steel mold which contained the alumina tubes. A low superheat was used to avoid pre-cracking the alumina tubes. The mold containing the alumina tubes was preheated to 550° C. The tubes were then filled with the solder alloy wire and sealed at the ends with refractory cement. The reinforcements were aligned only in transversel direction, the reason for using the tubes was to enhance the strength and recover a high percent the mechanical properties of the matrix after healing the matrix. A sample was obtained from the self-healing composite and a 2 mm diameter hole was made on the surface by drilling to simulate a crack, the hole pierced the ceramic tubes. This sample was then heated above 300° C. for five minutes and quenched to ambient temperature. The solder flowed out of the microtubes and sealed the hole demonstrating the reduction to practice of one of the concepts of this invention (FIG. 6A).

Specific Example No 2
2. Aluminum Alloy Self-Healing Composite with a Cut on the Surface A piece of matrix was cast with a low melting tin alloy in a ceramic tube as in Example 1 and a crack was created on one of the surfaces using a diamond saw to simulate a crack, the volume of the crack was 0.0948 cc. The external surface of the crack was then sealed with aluminum foil and refractory cement. The composite was then placed on a hot plate with crack side down to melt the solder within the microtube(s). The healing process in this case involved heating the damaged wall to 300° C., (this temperature is over the liquidus temperature of the alloy) and then cooling the composite to ambient temperature. This healing process resulted in a partial sealing of the crack (FIG. 6B) demonstrating reduction to practice. Further optimization can easily lead to complete sealing of the crack.

Specific Example No 3
3. Self-Healing Solder Alloy

The self-healing composite consists of solder/solder composite. The matrix solder was 99.3% Sn-0.7% Cu, which melts at 499 K and is commonly used as a solder material. A cylinder of this solder was cast, and a hole was machined down the length of this cylinder. This cavity was filled with a low melting point solder, 42% Sn-58% Bi, which melts at 411 K. Therefore, by raising the sample temperature to a point between 411 K and 499 K, the inner solder would be liquid, and the outer solder will remain solid.

Figures 7A, 7B:
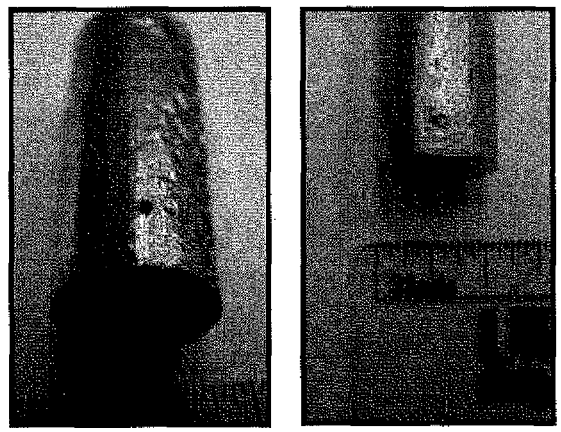
In FIG. 7(a) the photograph shows a high melting point solder rod with a hole at the surface that simulates the presence of a crack.
In FIG. 7(b) the photograph shows that the hole was sealed due to the flow of a low melting point alloy from the inner cavity resulting in self-healing of the simulated crack.

The test bar had a hole drilled from the surface which pierced the internal area of Sn—Bi alloy. The holes were simulating cracks which also have hollow spaces. The samples were, wrapped in aluminum foil, and clamped into a bracket to prevent any leaks. The sample package was fitted with a thermocouple to monitor the temperature of the samples. The samples were placed into a preheated furnace at 423 K. After 10 minutes in the furnace, the samples reached an ambient temperature of 423 K. The samples were held at 423 K for 30 minutes to allow healing to take place. The furnace was then shut off, and the samples were allowed to slowly cool inside the furnace. FIG. 7(a) shows the hole on the high melting solder rod with a 1 mm diameter hole drilled on the surface to simulate a crack, FIG. 7(b) shows the hole filled with low melting solder due to flow of the low melting solder from inner cavity into the hole, resulting in self-healing. This demonstrates self-healing of a hole in a solder matrix alloy through sealing of the hole.

Specific Example No 4
4. Aluminum Self-Healing Alloy Composite for Structural or Tribological Self-Healing Behavior.

Figure 8:
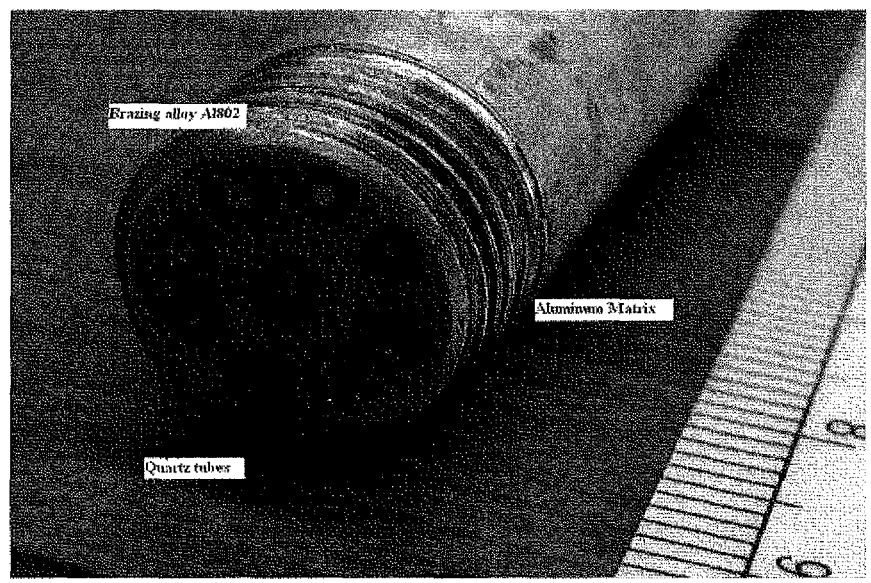
FIG. 8 shows a self-healing composite incorporating quartz tubes and brazing alloy A1802.

Aluminum Al206 matrix alloy was used as a matrix to synthesize a self-healing composite; quartz tubes with dimension of OD=2 mm and ID=1 mm were incorporated in the matrix and brazing alloy to heal the matrix and was incorporated into the hollow spaces within hollow quartz tubes. Nine tubes were placed into a preform and it was preheated above 600° C. to prevent any thermal stress the mold. The Aluminum alloy Al206 was melted and poured into the mold around preform of quartz tubes and cooled to ambient temperature to obtain an aluminum alloy composite incorporating hollow quartz tubes with low melting brazing alloy. Vacuum infiltration was used to infiltrate the hollow space in quartz tubes. One end of the sample composite was screwed into a cylindrical mold and the mold was put into a cylindrical open top furnace. The amount of 40 grams of Brazing aluminum alloy Al802 was put into the mold. The other end of sample was connected to a vacuum hose and sealed by cement to prevent any leaking air. In this process the atmospheric pressure and gravity help the vacuum infiltration. The furnace was turned on and the maximum temperature was set up to 400° C. over 25° C. of the melting temperature of the brazing alloy Al802. After 45 minutes the temperature was increased to 450° C. The brazing alloy was molten and vacuum was applied for 3 minutes and then was shut off. The Mold and the self-healing composite were cooled to in ambient temperature and then the composite was removed from the mold by torsion. The hollow space in the quartz tubes was filled with the brazing alloy. FIG. 8 shows the aluminum self-healing composite.

Specific Example No 5
5. Solder Self-Healing Composite Incorporated Carbon Microtubes.

Figure 9:
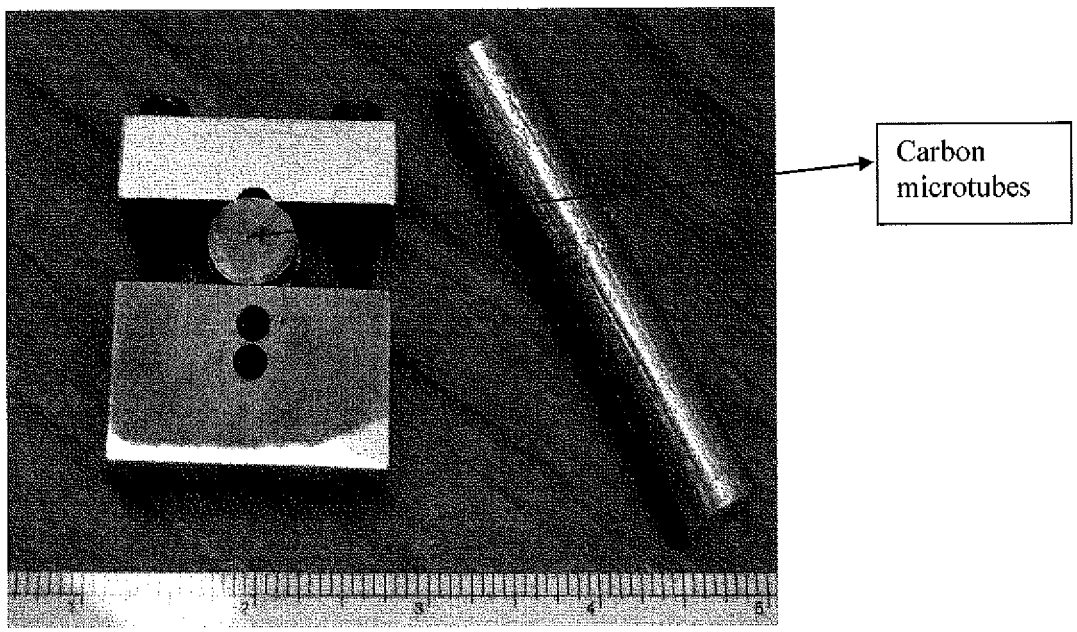
FIG. 9 shows a self-healing solder composite reinforced with carbon microtubes.

Composition of 99.3 wt % Sn, 0.7 wt % Cu matrix alloy and carbon fiber microtubes with dimensions of OD=700 μm and ID=300 μm were used to synthesize self-healing solder composites. Five carbon tubes were placed into a cylinder with holes on the top surface. This preform was placed in a preheated mold for about 5 minutes. The solder was placed into a crucible and put into a furnace at 260° C. The melt was poured into the mold and a pressure was applied to infiltrate the solder around the carbon fiber outer surfaces. The mold was cooled for 5 minutes at ambient temperature. FIG. 9 shows the self-healing solder matrix composite incorporating carbon microtubes.

Specific Example No 6
6. Aluminum Matrix Nanoparticle Composite A206-Al203 Nanoparticle Composite.

Figure 10:
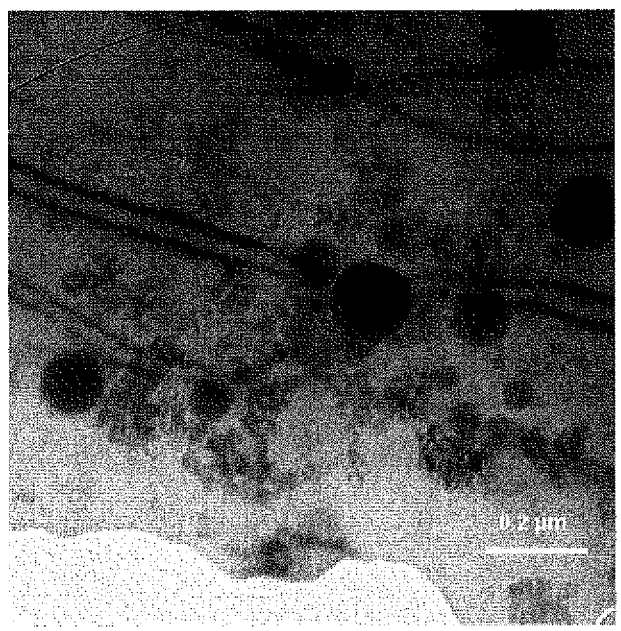
FIG. 10 shows a cast Aluminum metal matrix containing nanosize $Al_2O_3$ particles.

A206-Al203 nanopartice composite was synthesized by a hybrid manufacturing technique of stir mixing and ultrasonic dispersion of Aluminum oxide nanoparticles in presence of a wetting agent followed by squeeze casting. TEM samples of the cast Al-A206/$Al_2O_3$ clearly show nanoparticles present within the metal matrix (FIG. 10). EDX indicates that the grains are composed of aluminum, which contains nanosize $Al_2O_3$ particles. A crack traversing nanosize reactive particles could be made to "heal" by the reaction of these particles at a much more rapid rate due to the high surface area of the nanosize particles. The hybrid technique of synthesis of other material matrix nanoparticles or nanofiber or nanotubes which exhibit self healing are part of this invention.

The invention claimed is:

1. A self-healing composite comprising:
   a) A matrix selected from the group of consisting of lead or tin-based metal and their alloys, and including a crack having surfaces,
   b) A reinforcement in the said matrix consisting of shape memory material in a form selected from the group consisting of fibers, micro and nano size particles which are capable of shrinking upon heating,
   c) A particle or fiber reinforcement which is capable of expanding upon reaction with atmosphere thereby applying compressive stresses to the cracked matrix,
   d) Whereby upon heating of the matrix to a self-healing temperature with or without partial melting of the matrix, the crack surfaces in the said matrix are brought together and healed due to shrinkage of said shape memory material or expansion of said particle or fiber reinforcement upon reaction with atmosphere.

2. The material of claim 1 where the volume percentage of shape memory reinforcement material is more than one percent.

3. the material of claim 1 where the shape memory material is in the form of fibers or particles and the matrix material becomes partly liquid at the crack surface at the self-healing temperature and the crack surfaces are welded upon contraction of the shape memory material fibers or particles.

4. The material of claim 1 where the reinforcement expands upon reaction with atmosphere and seals the crack.

5. A self-healing material of claim 1 which has been synthesized using at least one or a combination of two or more processes of stir mixing, ultrasonic mixing, addition of reaction agents, application of pressure, and powder metallurgy processes.

6. A self-healing material of claim 1, wherein said heating comprises using at least one of electromagnetic induction, microwave, ultrasonic ballistic, and laser energy to selectively locally heat the shape memory material and/or react the particle or fiber reinforcement to trigger healing of a localized area of the crack.

7. A material including a self-healing matrix selected from the group consisting of a lead or tin base metal or their alloys, comprising a crack and further comprising hollow spaces in the form of continuous hollow vascular networks through which fluid healing agent can flow to reach the crack, the fluid upon solidification due to cooling capable of sealing the crack.

8. A turbine shaped part comprising cooling passages and made of the material of claim 7.

9. The material of claim 7 which has been synthesized by at least one method selected from the group consisting of solidification, powder metallurgy and additive manufacturing processes.

* * * * *